US011116308B2

(12) United States Patent
Miller et al.

(10) Patent No.: US 11,116,308 B2
(45) Date of Patent: Sep. 14, 2021

(54) TECHNIQUES FOR ACTIVATING A PERSONAL CARE DEVICE FOR USE WITH A PRODUCT

(71) Applicant: L'Oreal, Paris (FR)

(72) Inventors: Zane Bowman Allen Miller, Seattle, WA (US); Geoffrey Deane, Redmond, WA (US)

(73) Assignee: L'Oreal, Paris (FR)

( * ) Notice: Subject to any disclaimer, the term of this patent is extended or adjusted under 35 U.S.C. 154(b) by 47 days.

(21) Appl. No.: 16/383,394

(22) Filed: Apr. 12, 2019

(65) Prior Publication Data

US 2020/0323337 A1 Oct. 15, 2020

(51) Int. Cl.
*A46B 15/00* (2006.01)
*H04L 29/06* (2006.01)
*G06F 21/30* (2013.01)
*H04W 12/47* (2021.01)

(52) U.S. Cl.
CPC ...... *A46B 15/0004* (2013.01); *A46B 15/0038* (2013.01); *G06F 21/305* (2013.01); *H04L 63/0892* (2013.01); *H04W 12/47* (2021.01)

(58) Field of Classification Search
CPC . H04L 63/08; H04L 63/0853; H04L 63/0428; H04L 63/0807; H04L 63/0823; H04L 63/10; H04L 63/20; H04L 67/42; H04L 12/1822; H04L 63/0861; H04L 63/102; H04L 63/205; H04L 63/0892; G06F 21/335; G06F 21/31; G06F 21/32; G06F 21/34; G06F 21/46; G06F 2221/2115; G06F 2221/2117; G06F 21/305; G06Q 20/341; G06Q 20/4014; G06Q 20/40975; G07C 9/22; G07F 7/1008; H04W 12/00407; A46B 15/0004; A61B 15/0038
See application file for complete search history.

(56) References Cited

U.S. PATENT DOCUMENTS

| | | | |
|---|---|---|---|
| 10,978,191 B2* | 4/2021 | Collins, Jr. | G08B 5/222 |
| 2001/0051787 A1* | 12/2001 | Haller | G16H 40/40 604/66 |
| 2002/0082665 A1* | 6/2002 | Haller | A61N 1/37282 607/60 |
| 2004/0015132 A1* | 1/2004 | Brown | A61B 5/742 604/131 |

(Continued)

*Primary Examiner* — Abiy Getachew
(74) *Attorney, Agent, or Firm* — Christensen O'Connor Johnson Kindness PLLC

(57) ABSTRACT

In some embodiments, an authorization server device receives a request for an activation token to activate a personal care device. The authorization server device determines an authorized usage amount, and generates an activation token based on the authorized usage amount to be transmitted to the personal care device. Activation of a personal care device may be authorized based on consumable products obtained for use with the personal care device. By limiting activation of the personal care device based on consumable products obtained for use with the personal care device, the technical problems in overuse of some consumable products (such as brush heads) or underuse of other consumable products (such as serums or cleansers) can be avoided, and maximum results from use of the personal care devices can be easier to obtain.

12 Claims, 8 Drawing Sheets

(56) References Cited

U.S. PATENT DOCUMENTS

| | | | |
|---|---|---|---|
| 2005/0192649 A1* | 9/2005 | Shehadeh | G16H 40/67 607/60 |
| 2010/0318783 A1* | 12/2010 | Raj | G06Q 20/10 713/150 |
| 2011/0185821 A1* | 8/2011 | Genosar | G01F 1/7046 73/861.08 |
| 2012/0173348 A1* | 7/2012 | Yoo | G06Q 20/10 705/16 |
| 2016/0019353 A1* | 1/2016 | Cavagnaro | G16H 10/60 705/3 |
| 2018/0336511 A1* | 11/2018 | Cantley | G06Q 10/087 |

* cited by examiner

TECHNIQUES FOR ACTIVATING A PERSONAL CARE DEVICE FOR USE WITH A PRODUCT

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a method of activating a personal care device is provided. The method is implemented by at least one computer processor programmed by one or more machine instructions. An activation request is received from the personal care device. An activation token associated with the personal care device is requested from an authorization server. In response to receiving the activation token, the activation token is transmitted to the personal care device to activate the personal care device for an amount of use indicated by the activation token.

In some embodiments, a personal care device is provided. The personal care device comprises a treatment application device, a human-machine interface (HMI) device, a network interface, at least one processor, and a non-transitory computer-readable medium. The computer-readable medium has computer-executable instructions stored thereon that, in response to execution by the at least one processor, cause the personal care device to perform actions including: detecting actuation of the HMI device; transmitting an activation request to a computing device via the network interface; receiving an activation token from the computing device via the network interface; and in response to determining that the activation token authorizes activation of the treatment application device, activating the treatment application device.

In some embodiments, a non-transitory computer-readable medium is provided. The computer-readable medium has computer-executable instructions stored thereon that, in response to execution by one or more processors of a computing device, cause the computing device to perform actions comprising: receiving a request for an activation token for use in activating a personal care device, wherein the request includes an identifier associated with the personal care device; determining an authorized usage amount based on the identifier associated with the personal care device; generating an activation token based on the authorized usage amount; and transmitting the activation token in response to the request for the activation token.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Personal care devices are increasingly helping people improve their daily routines, whether it is for skincare, dental care, or other personal care tasks. Personal care devices are often used along with consumable products, such as removable brush heads, serums, cleansers, and the like. One issue with obtaining peak benefit from use of a personal care device is that it should be used according to recommended guidelines in order to obtain maximum results. Unfortunately, users may often find it difficult to use a removable brush head for only the recommended number of uses (or the recommended amount of time), or to use at least the recommended amount of serum or cleanser for each usage.

In some embodiments of the present disclosure, activation of a personal care device is authorized based on consumable products obtained for use with the personal care device. By limiting activation of the personal care device based on consumable products obtained for use with the personal care device, the technical problems in overuse of some consumable products (such as brush heads) or underuse of other consumable products (such as serums or cleansers) can be avoided, and maximum results from use of the personal care devices can be easier to obtain.

Figure 1:
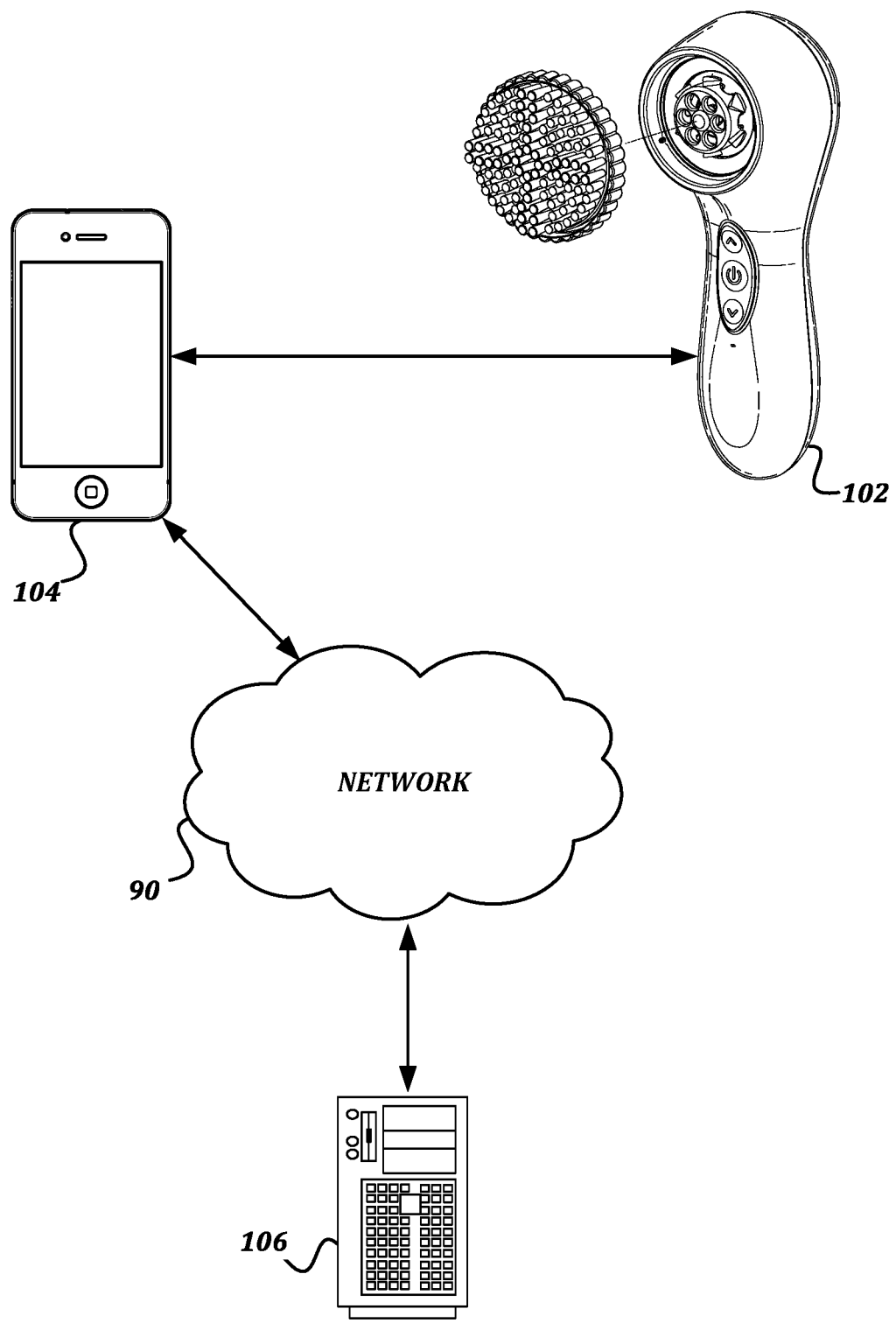
FIG. 1 is a schematic drawing that illustrates an example embodiment of a system for activating a personal care device according to various aspects of the present disclosure.

FIG. 1 is a schematic drawing that illustrates an example embodiment of a system for activating a personal care device according to various aspects of the present disclosure. As shown, a personal care device 102 communicates with a networked computing device 104. The networked computing device 104, in turn, communicates with an authorization server device 106 via a network 90. The network 90 may include any suitable networking technology, including but not limited to wired technology such as Ethernet, USB, or FireWire; wireless technology such as Wi-Fi, WiMAX, 2G, 3G, 4G, LTE, NFC, or Bluetooth; and the Internet.

In some embodiments, the personal care device 102 cannot be activated unless an authorization token is received. The networked computing device 104 may receive authorization tokens from the authorization server device 106, and may transmit them to the personal care device 102 in order to enable activation of the personal care device 102. In some embodiments, the authorization server device 106 provides authorization token based on a record of consumable products associated with the user of the personal care device 102. In some embodiments, the personal care device 102 or the networked computing device 104 may be configured to scan identifiers from consumable products, and to transmit them to the authorization server device 106 via the network 90 in order to obtain authorization tokens.

Figure 2:
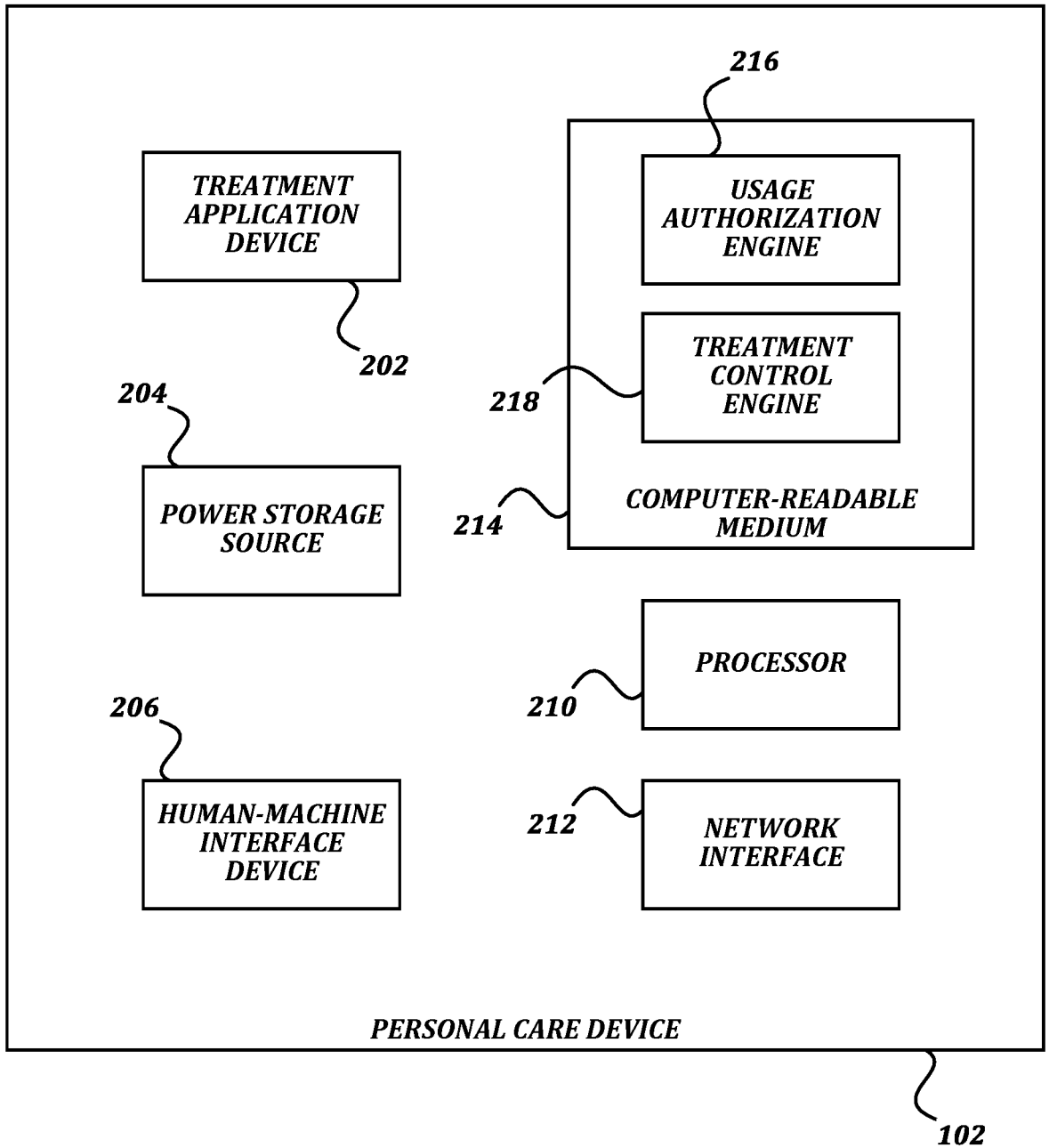
FIG. 2 is a block diagram that illustrates components included in an example embodiment of a personal care device according to various aspects of the present disclosure.

FIG. 2 is a block diagram that illustrates components included in an example embodiment of a personal care device according to various aspects of the present disclosure. In some embodiments, the personal care device 102 is any type of powered device that can be used as part of a daily personal care routine. One non-limiting example of a personal care device 102 is a powered brush with a head that oscillates, rotates, or otherwise moves in order to perform a scrubbing action. Another non-limiting example of a personal care device 102 is a handheld light-emitting device that may be used to expose skin to light to achieve therapeutic benefits.

In the illustrated embodiment, the personal care device 102 includes a treatment application device 202, a power storage source 204, a human-machine interface device 206, a processor 210, a network interface 212, and a computer-readable medium 214.

In some embodiments, the treatment application device 202 includes one or more devices that collectively apply a treatment to a user. For example, if the personal care device 102 is a powered brush, the treatment application device 202 may include a drive motor, an armature coupled to the drive motor that accepts a detachable brush head, and the brush head itself. As another example, if the personal care device 102 is a handheld light-emitting device, the treatment application device 202 may include one or more light-emitting diodes (LEDs), lasers, or other light-emitting devices.

In some embodiments, the power storage source 204 is a device, such as a rechargeable battery, that provides power to the treatment application device 202 for operation. In some embodiments, the power storage source 204 may also provide power for operation to the other components of the personal care device 102. In some embodiments, instead of a power storage source 204, the personal care device 102 may be coupled to an external power source, such as a wall power outlet.

In some embodiments, the human-machine interface (HMI) device 206 is any type of device capable of being actuated by a user to generate a signal. Some non-limiting examples of HMI devices 206 include a push-button switch, a toggle switch, a capacitive switch, a rotary switch, a slide switch, and a rocker switch. In some embodiments, the optional loudspeaker 208 may be included in order to allow the personal care device 102 to present audio content.

In some embodiments, the processor 210 is configured to execute computer-executable instructions stored on the computer-readable medium 214. The processor 210 may also be configured to receive and transmit signals to and/or from the other components of the personal care device 102 via a communication bus or other circuitry. In some embodiments, the network interface 212 is configured to transmit and receive signals to and from the networked computing device 104 on behalf of the processor 210. The network interface 212 may implement any suitable networking technology, including but not limited to short-range wireless technologies such as Bluetooth, infrared, near-field communication, and Wi-Fi; long-range wireless technologies such as WiMAX, 2G, 3G, 4G, and LTE; and wired technologies such as USB, FireWire, and Ethernet. In some embodiments, the computer-readable medium 214 is any type of computer-readable medium on which computer-executable instructions may be stored, including but not limited to a flash memory, a ROM, an EPROM, an EEPROM, and an FPGA. In some embodiments, the computer-readable medium 214 and the processor 210 may be combined into a single device, such as an ASIC, or the computer-readable medium 214 may include a cache memory, a register, or another component of the processor 210.

In the illustrated embodiment, the computer-readable medium 214 has computer-executable instructions stored thereon that, in response to execution by the processor 210, cause the personal care device 102 to provide a usage authorization engine 216 and a treatment control engine 218. In general, the word "engine," as used herein, refers to logic embodied in hardware or software instructions, which can be written in a programming language, such as C, C++, COBOL, JAVA™, PHP, Perl, HTML, CSS, JavaScript, VBScript, ASPX, Microsoft .NET™, and/or the like. An engine may be compiled into executable programs or written in interpreted programming languages. Software engines may be callable from other engines or from themselves. Generally, the engines described herein refer to logical modules that can be merged with other engines, or can be divided into sub engines. The engines can be stored in any type of computer readable medium or computer storage device and be stored on and executed by one or more general purpose computers, thus creating a special purpose computer configured to provide the engine or the functionality thereof.

In some embodiments, the treatment control engine 218 detects actuation of the HMI device 206, and activates the treatment application device 202 in response. The treatment control engine 218 may then detect a subsequent actuation of the HMI device 206 and deactivate the treatment application device 202 in response, or may allow the treatment application device 202 to operate for a predetermined amount of time before automatically deactivating the treatment application device 202. In some embodiments, the usage authorization engine 216 detects when the HMI device 206 is activated, and determines whether the treatment control engine 218 is authorized to activate the treatment application device 202 before allowing activation.

Further details of the functionality of the components of the personal care device 102 are provided below.

Figure 3:
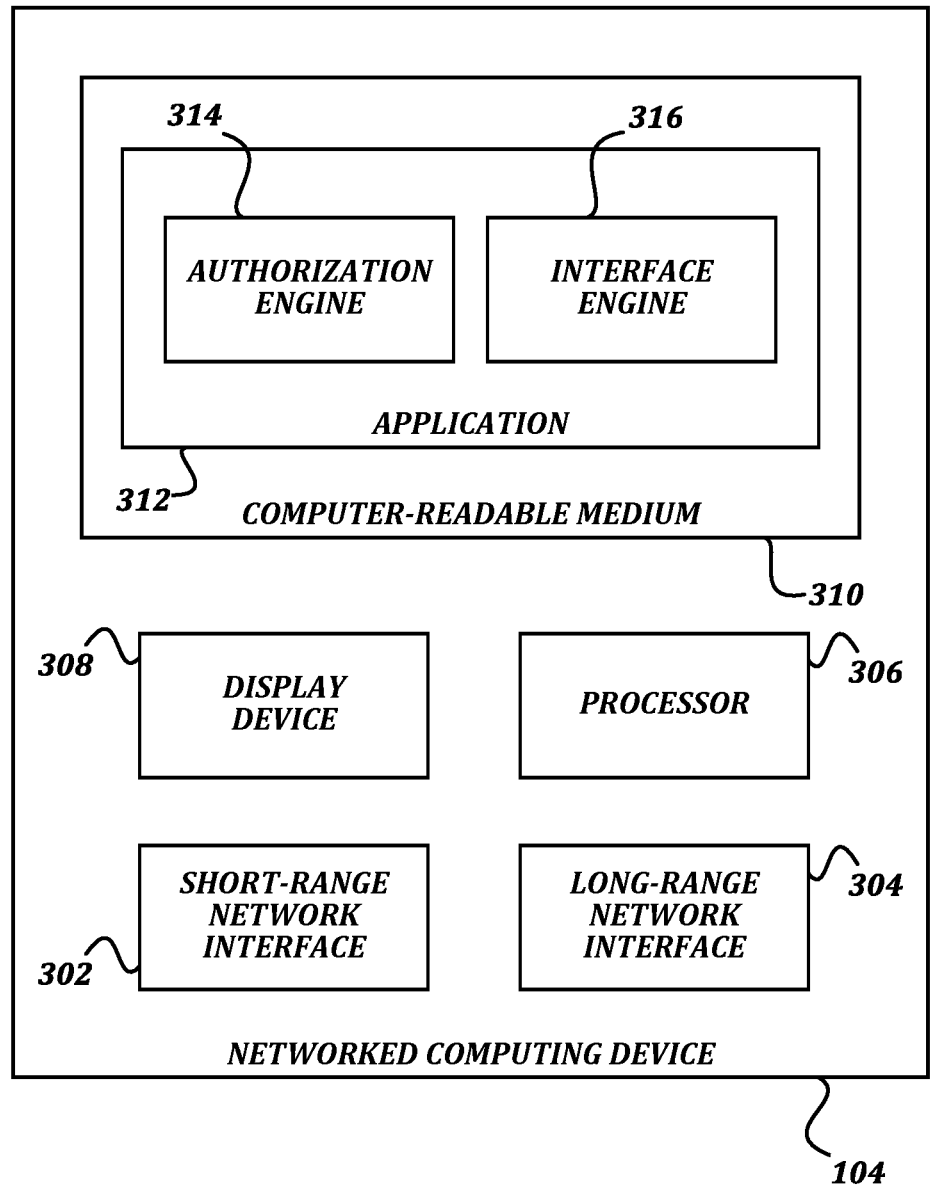
FIG. 3 is a block diagram that illustrates components included in an example embodiment of a networked computing device according to various aspects of the present disclosure.

FIG. 3 is a block diagram that illustrates components included in an example embodiment of a networked computing device according to various aspects of the present disclosure. The networked computing device 104 may be a computing device of any form factor that is capable of communicating with the personal care device 102 and the authorization server device 106, and of performing the other actions described herein as being performed by the networked computing device 104. In some embodiments, the networked computing device 104 may be a mobile computing device such as a smartphone or a tablet computing device. In some embodiments, the networked computing device 104 may be a desktop computing device or a laptop computing device. In some embodiments, the personal care device 102 may communicate directly with the authorization server device 106 or may communicate with the authorization server device 106 via one or more other devices that do not perform more than information relay tasks. In such embodiments, the functionality described as being performed by the networked computing device 104 may be split between the personal care device 102 and the authorization server device 106.

In the illustrated embodiment, the networked computing device 104 includes a short-range network interface 302, a long-range network interface 304, a processor 306, a display device 308, and a computer-readable medium 310.

In some embodiments, the short-range network interface 302 is configured to transmit and receive signals to and from the personal care device 102 on behalf of the processor 306. The short-range network interface 302 may implement any suitable networking technology, and implements a complementary technology to that implemented by the network interface 212 of the personal care device 102. In some embodiments, the long-range network interface 304 is configured to transmit and receive signals to and from one or more remote systems, including but not limited to the authorization server device 106. The long-range network interface 304 may implement any suitable networking technology capable of communicatively coupling the networked computing device 104 to the remote systems, including but not limited to wired technologies such as Ethernet, USB, and FireWire; and wireless technologies such as Wi-Fi, WiMAX, 2G, 3G, 4G, LTE, Bluetooth, infrared, and NFC. The short-range network interface 302 and the long-range network interface 304 are described as "short range" and "long range" for convenience only, and these descriptors should not be seen as limiting with respect to the relative distances between the personal care device 102, the networked computing device 104, and any remote systems.

In some embodiments, the display device 308 is configured to present one or more graphical user interfaces, including but not limited to a graphical user interface generated by the application 312. In some embodiments, the display device 308 may also be configured to receive inputs from a user, such as a touchscreen device.

In some embodiments, the processor 306 is configured to execute computer-executable instructions stored on the computer-readable medium 310. The processor 306 may also be configured to receive and transmit signals to and/or from the other components of the networked computing device 104 via a communication bus or other circuitry.

In some embodiments, the computer-readable medium 310 has computer-executable instructions stored thereon that, in response to execution by the processor 306, cause the networked computing device 104 to provide an application 312. The computer-readable medium 310 may be any suitable type of computer-readable medium 310, including but not limited to flash memory, a hard disk drive, or any other type of non-transitory computer-readable medium.

In some embodiments, the application 312 may be installed on the networked computing device 104 after being downloaded from an app store or other distribution point. In some embodiments, the application 312 may be a web-based application, and components may be downloaded and executed within a web browser or other thin interface installed on the networked computing device 104.

In the illustrated embodiment, the application 312 includes an authorization engine 314 and an interface engine 316. In some embodiments, the authorization engine 314 obtains unique identifiers of consumable products, and transmits them to the authorization server device 106. In some embodiments, the authorization engine 314 receives authorization tokens from the authorization server device 106, and transmits the authorization tokens to the personal care device 102 to allow the usage authorization engine 216 to enable activation of the treatment application device 202. In some embodiments, the interface engine 316 generates a graphical user interface to be presented via the display device 308. The graphical user interface may be used to review authorized usage amounts stored by the authorization server device 106, to instruct the application 312 to transfer authorization tokens to the personal care device 102, to review amounts of authorized usage that have already been used, to manage account information at the authorization server device 106, or to provide other functionality related to the system.

Further details of the functionality of the components of the networked computing device 104 are provided below.

Figure 4:
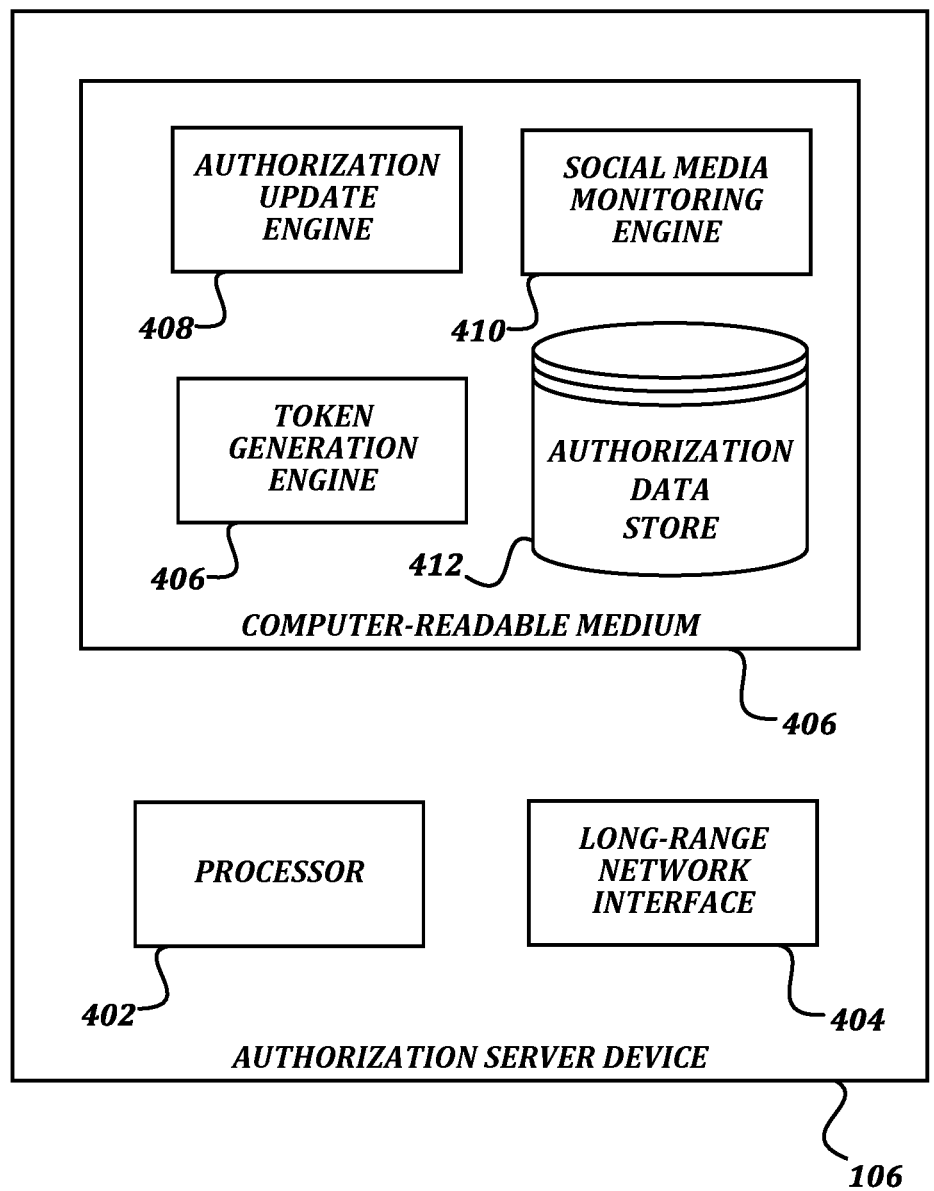
FIG. 4 is a block diagram that illustrates components included in an example embodiment of an authorization server device according to various aspects of the present disclosure.

FIG. 4 is a block diagram that illustrates components included in an example embodiment of an authorization server device according to various aspects of the present disclosure. In some embodiments, the monitoring server device 106 is a server computing device, a cloud-based server, or cloud-based service that receives usage records and provides rewards based thereon.

In the illustrated embodiment, the monitoring server device 106 includes a processor 402, a network interface 404, and a computer-readable medium 406. In some embodiments, the processor 402 is configured to execute computer-executable instructions stored on the computer-readable medium 406. The processor 402 may also be configured to receive and transmit signals to and/or from the other components of the monitoring server device 106 via a communication bus or other circuitry. In some embodiments, the network interface 404 is configured to transmit and receive signals to and from the usage monitor computing device 104. Any suitable communication technology that is complementary to the communication technology implemented by the long-range network interface 304 of the usage monitor computing device 104.

In some embodiments, the computer-readable medium 406 has computer-executable instructions stored thereon that, in response to execution by the processor 402, cause the monitoring server device 106 to provide a reward engine 408. In some embodiments, the computer-readable medium 406 also stores at least part of a usage data store 410. In some embodiments, the reward engine 408 is configured to usage records via the network interface 404, and stores the usage records in the usage data store 410. In some embodiments, the reward engine 408 is configured to review usage records stored in the usage data store 410, and to transmit indications of rewards to the usage monitor computing device 104 based on the usage records.

As understood by one of ordinary skill in the art, a "data store" as described herein may be any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, as described further below. One of ordinary skill in the art will recognize that separate data stores described herein may be combined into a single data store, and/or a single data store described herein may be separated into multiple data stores, without departing from the scope of the present disclosure.

Further details of the functionality of the components of the monitoring server device 106 are provided below.

Figure 5A:
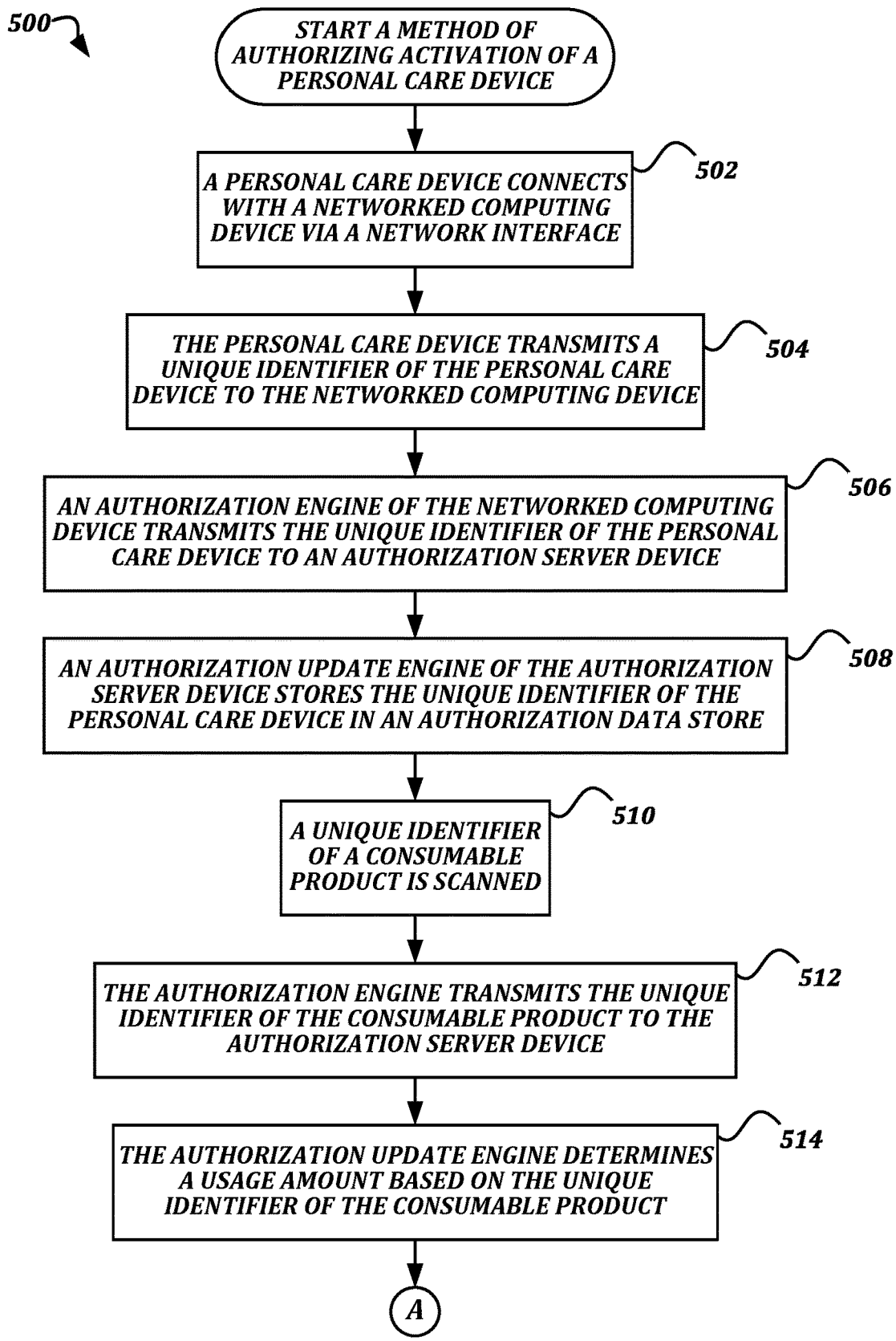
FIGS. 5A-5C are a flowchart that illustrates an example embodiment of a method of authorizing activation of a personal care device according to various aspects of the present disclosure.
Figure 5B:
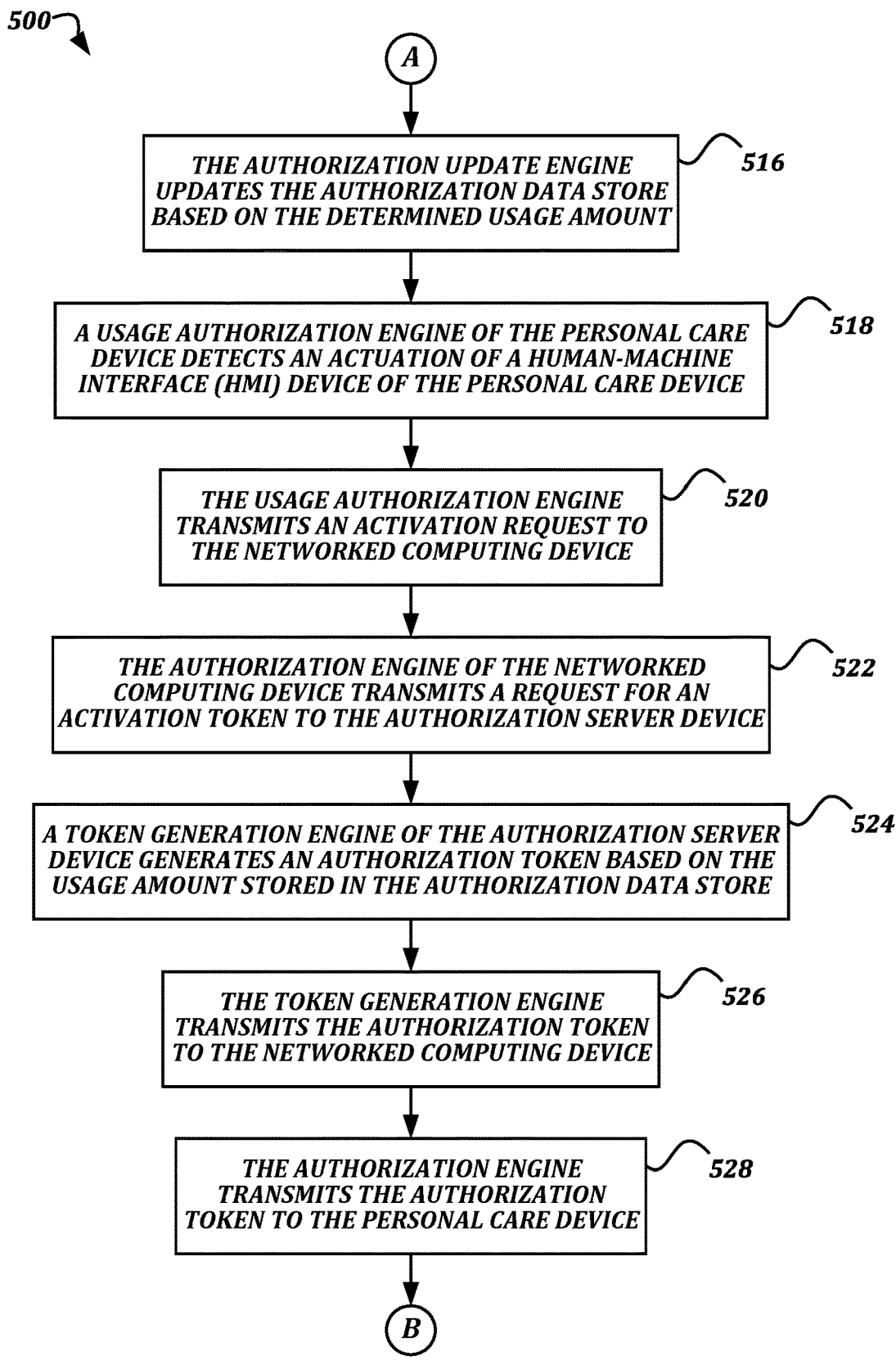
Figure 5C:
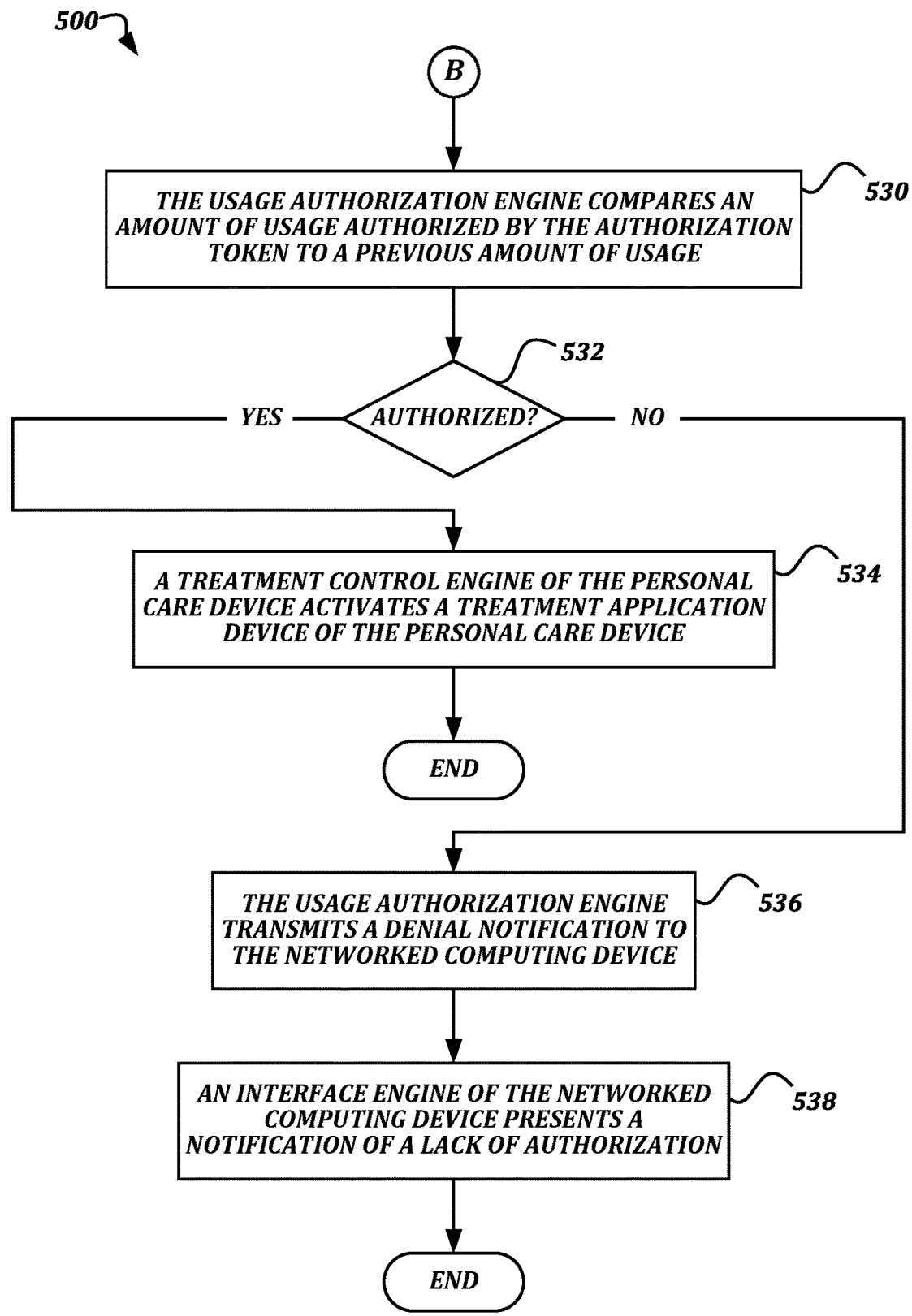

FIGS. 5A-5C are a flowchart that illustrates an example embodiment of a method of authorizing activation of a personal care device according to various aspects of the present disclosure. From a start block, the method 500 advances to block 502, where a personal care device 102 connects with a networked computing device 104 via a network interface 212. In some embodiments, connecting may include conducting a pairing process between the personal care device 102 and the networked computing device 104, such as Bluetooth pairing. In some embodiments, a pairing process may have been conducted previously, and the connection created in block 502 is a new active connection. In some embodiments, the pairing may be managed within the application 312. In some embodiments, the pairing may be managed by an operating system of the networked computing device 104. In some embodiments, another type of connection, such as an IP-based connection over Wi-Fi or an NFC connection, may be established.

At block 504, the personal care device 102 transmits a unique identifier of the personal care device 102 to the networked computing device 104. The unique identifier is any value that uniquely identifies the personal care device 102. In some embodiments, the unique identifier may be assigned to the personal care device 102 at the time of manufacture, and may be stored on a computer-readable medium of the personal care device 102. In some embodiments, the unique identifier may be a media access control (MAC) address associated with the network interface 212.

At block 506, an authorization engine 314 of the networked computing device 104 transmits the unique identifier of the personal care device 102 to an authorization server device 106. In some embodiments, the authorization engine 314 may transmit the unique identifier via the long-range network interface 304 and the network 90.

At block 508, an authorization update engine 408 of the authorization server device 106 stores the unique identifier of the personal care device 102 in an authorization data store 412. In some embodiments, the unique identifier may be stored in association with a user account associated with the networked computing device 104. In some embodiments, the record stored in the authorization data store 412 may include an authorized usage amount associated with the user account and/or the personal care device 102.

At block 510, a unique identifier of a consumable product is scanned. In some embodiments, the scanning may be performed by the networked computing device 104. In some embodiments, the scanning may be performed by the personal care device 102, and the unique identifier of the consumable product may be transmitted to the networked computing device 104. In some embodiments, scanning may include capturing an image of a bar code that represents a unique identifier of the consumable product. In some embodiments, scanning may include interrogating an RFID tag that stores the unique identifier of the consumable product.

At block 512, the authorization engine 314 transmits the unique identifier of the consumable product to the authorization server device 106. As with the unique identifier of the personal care device 102, the authorization engine may transmit the unique identifier of the consumable product via the long-range network interface 304 and the network 90.

At block 514, the authorization update engine 408 determines a usage amount based on the unique identifier of the consumable product. In some embodiments, different consumable products may be associated with different usage amounts. For example, a small container of a consumable product may be associated with a lower usage amount than a large container of the same consumable product. As another example, a container of a high-cost consumable product may be associated with a higher usage amount than a similarly sized container of a low-cost consumable product. As another example, a given consumable product may be associated with a predetermined usage amount (e.g., a disposable brush head may be associated with a given number of uses before being considered worn out). In some embodiments, the authorization update engine 408 may use the unique identifier of the consumable product to look up in a data store (not pictured) characteristics of the consumable product on which the usage amount is based. In some embodiments, the authorization update engine 408 may also ensure that the unique identifier of the consumable product has not already been used by the system to authorize usage.

The method 500 then proceeds to a continuation terminal ("terminal A"). From terminal A (FIG. 5B), the method 500 proceeds to block 516, where the authorization update engine 408 updates the authorization data store 412 based on the determined usage amount. In some embodiments, the authorization update engine 408 updates the record stored in the authorization data store 412 that is associated with the user or the personal care device 102 to add the determined usage amount.

At block 518, a usage authorization engine 216 of the personal care device 102 detects an actuation of a human-machine interface (HMI) device 206 of the personal care device 102. For example, if the HMI device 206 is a push-button switch, the usage authorization engine 216 may receive a signal that indicates that the push-button switch was pressed.

At block 520, the usage authorization engine 216 transmits an activation request to the networked computing device 104. In some embodiments, the activation request is transmitted via the network interface 212. At block 522, the authorization engine 314 of the networked computing device 104 transmits a request for an activation token to the authorization server device 106. In some embodiments, the request for the activation token is transmitted to the authorization server device 106 via the long-range network interface 304 and the network 90. In some embodiments, the request for the activation token may include an identifier of the user, the unique identifier of the personal care device 102, or any other information that can uniquely identify an appropriate record within the authorization data store 412 that stores the usage amounts associated with the user and/or the personal care device 102.

At block 524, a token generation engine 406 of the authorization server device 106 generates an authorization token based on the usage amount stored in the authorization data store 412. In some embodiments, the usage amount may be a cumulative period of time for which the treatment application device 202 may be activated. In some embodiments, the usage amount may be a number of times that the treatment application device 202 may be activated. In some embodiments, the authorization token may authorize a single activation, and multiple authorization tokens may be generated if the usage amount stored in the authorization store 412 authorizes more than one activation. In some embodiments, the authorization token may store the usage amount. In some embodiments, the authorization token may be cryptographically signed by the authorization server device 106 using any suitable signing algorithm, including but not limited to the Digital Signature Algorithm (DSA), and using a certificate associated with the authorization server device 106.

At block 526, the token generation engine 406 transmits the authorization token to the networked computing device 104. In some embodiments, the token generation engine 406 transmits the authorization token via the long-range network interface 404 and the network 90. At block 528, the authorization engine 414 transmits the authorization token to the personal care device 102. In some embodiments, the transmission of the authorization token occurs via the short-range wireless interface 302. In some embodiments, the authorization engine 414 may transmit the same authorization token that it received from the authorization server device 106. In some embodiments, the authorization engine 414 may use the authorization token received from the authorization server device 106 to generate a new authorization token to be transmitted to the personal care device 102. For example, if the authorization token received from the authorization server device 106 authorizes a total of six uses, the authorization engine 314 may generate six separate single-use authorization tokens to be transmitted to the personal care device 102.

The method 500 then proceeds to a continuation terminal ("terminal B"). From terminal B (FIG. 5C), the method 500 proceeds to block 530, where the usage authorization engine 216 compares an amount of usage authorized by the authorization token to a previous amount of usage. In some embodiments, the usage authorization engine 216 may compare a stored value that represents a number of times or an elapsed time for which the personal care device 102 has been activated since obtaining the authorization token to the amount of usage authorized by the authorization token. If the authorization token is a one-time use token, then the comparison could be skipped, and the usage authorization engine 216 may just authenticate the authorization token without performing a further comparison. In some embodiments, the usage authorization engine 216 may also validate a cryptographic signature applied to the authorization token to authenticate that the authorization token is valid.

At decision block 532, a determination is made regarding whether the activation of the personal care device 102 is authorized based on the authorization token and the previous amount of usage. If the authorization token does authorize further usage after the previous amount of usage, then the result of decision block 532 is YES, and the method 500 proceeds to block 534, where a treatment control engine 218 of the personal care device 102 activates a treatment application device 202 of the personal care device 102. For example, if the treatment application device 202 includes a drive motor, the treatment control engine 218 may start operating the drive motor using a power or intensity specified by the mode for an amount of time specified by the mode. As another example, if the treatment application device 202 includes a light, the treatment control engine 218 may cause the light to be activated at an intensity and/or wavelength specified by the mode for an amount of time specified by the mode. The method 500 then proceeds to an end block and terminates.

Returning to decision block 532, if the activation of the personal care device 102 is not authorized based on the authorization token, then the result of decision block 532 is NO, and the method 500 proceeds to block 536. At block 536, the usage authorization engine 216 transmits a denial notification to the networked computing device 104. In some embodiments, the denial notification may be transmitted via the network interface 212. In some embodiments, the personal care device 102 may itself present an indication of the denial, such as a beep, a vibration, or other indication. At block 538, an interface engine 316 of the networked computing device 104 presents a notification of a lack of authorization. In some embodiments, the notification of the lack of authorization may indicate how the user can obtain further authorized usage, such as by scanning another consumable product, by adding funds to an account with the authorization server device 106, or by any other technique. The method 500 then proceeds to an end block and terminates.

Though embodiments that include a personal care device 102, a networked computing device 104, and an authorization server device 106 are primarily discussed above, in some embodiments, more or fewer devices may be used. For example, in some embodiments, a majority of the functionality may be present in the personal care device 102. In such embodiments, the personal care device 102 may have a sensor that is capable of scanning a bar code or RFID tag associated with the consumable product, and the usage authorization engine 216 may be configured to validate a key stored within the bar code or RFID tag in order to authorize use. In some embodiments, further information may be used in order to authorize use as well, other than just the authorization token. For example, the personal care device 102 may include sensors that are capable of detecting pH, performing assays, determining a color or light spectrum, and so on, that would allow the personal care device 102 to identify the consumable product being used, and to determine whether the consumable product is an authorized product.

Figure 6:
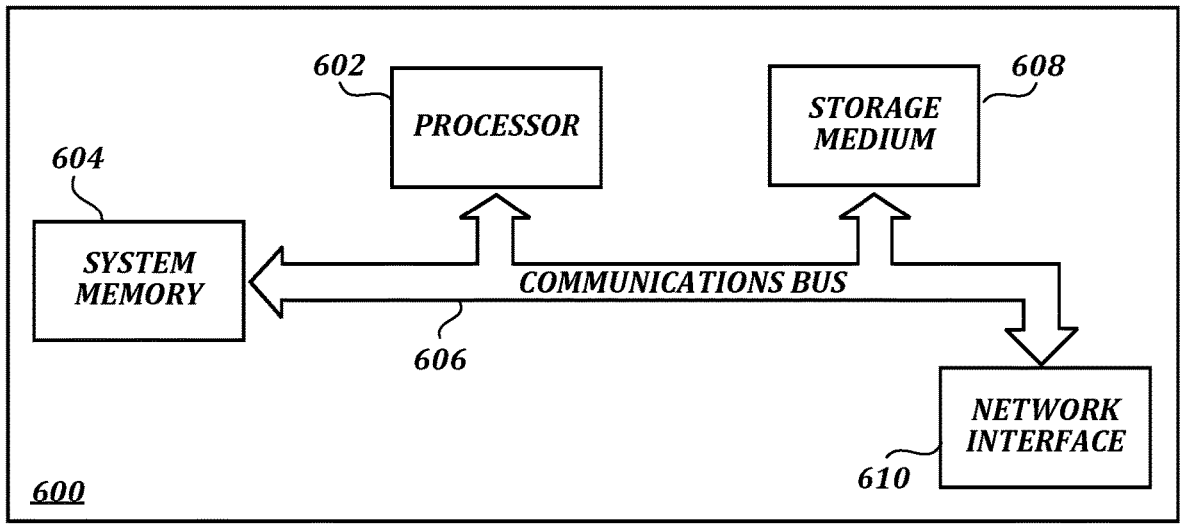
FIG. 6 is a block diagram that illustrates aspects of an exemplary computing device appropriate for use with embodiments of the present disclosure.

FIG. 6 is a block diagram that illustrates aspects of an exemplary computing device appropriate for use with embodiments of the present disclosure. While FIG. 6 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 600 may be any one of any number of currently available or yet to be developed devices.

In its most basic configuration, the computing device 600 includes at least one processor 602 and a system memory 604 connected by a communication bus 606. Depending on the exact configuration and type of device, the system memory 604 may be volatile or nonvolatile memory, such as read only memory ("ROM"), random access memory ("RAM"), EEPROM, flash memory, or similar memory technology. Those of ordinary skill in the art and others will recognize that system memory 604 typically stores data and/or program modules that are immediately accessible to and/or currently being operated on by the processor 602. In this regard, the processor 602 may serve as a computational center of the computing device 600 by supporting the execution of instructions.

As further illustrated in FIG. 6, the computing device 600 may include a network interface 610 comprising one or more components for communicating with other devices over a network. Embodiments of the present disclosure may access basic services that utilize the network interface 610 to perform communications using common network protocols. The network interface 610 may also include a wireless network interface configured to communicate via one or more wireless communication protocols, such as WiFi, 2G, 3G, 4G, LTE, WiMAX, Bluetooth, and/or the like.

In the exemplary embodiment depicted in FIG. 6, the computing device 600 also includes a storage medium 608. However, services may be accessed using a computing device that does not include means for persisting data to a local storage medium. Therefore, the storage medium 608 depicted in FIG. 6 is represented with a dashed line to indicate that the storage medium 608 is optional. In any event, the storage medium 608 may be volatile or nonvolatile, removable or nonremovable, implemented using any technology capable of storing information such as, but not limited to, a hard drive, solid state drive, CD-ROM, DVD, or other disk storage, magnetic cassettes, magnetic tape, magnetic disk storage, and/or the like.

As used herein, the term "computer-readable medium" includes volatile and nonvolatile and removable and non-removable media implemented in any method or technology capable of storing information, such as computer-readable instructions, data structures, program modules, or other data. In this regard, the system memory 604 and storage medium 608 depicted in FIG. 6 are merely examples of computer-readable media.

Suitable implementations of computing devices that include a processor 602, system memory 604, communication bus 606, storage medium 608, and network interface 610 are known and commercially available. For ease of illustration and because it is not important for an understanding of the claimed subject matter, FIG. 6 does not show some of the typical components of many computing devices. In this regard, the computing device 600 may include input devices, such as a keyboard, keypad, mouse, microphone, touch input device, touch screen, tablet, and/or the like. Such input devices may be coupled to the computing device 600 by wired or wireless connections including RF, infrared, serial, parallel, Bluetooth, USB, or other suitable connections protocols using wireless or physical connections. Similarly, the computing device 600 may also include output devices such as a display, speakers, printer, etc. Since these devices are well known in the art, they are not illustrated or described further herein. Unless specifically defined herein, all terms used herein have the same meaning as they would to one skilled in the art of the present disclosure.

While illustrative embodiments have been illustrated and described, it will be appreciated that various changes can be made therein without departing from the spirit and scope of the invention.

The embodiments of the invention in which an exclusive property or privilege is claimed are defined as follows:

1. A personal care device, comprising:
   a treatment application device;
   a human-machine interface (HMI) device;
   a network interface;
   at least one processor; and
   a non-transitory computer-readable medium having computer-executable instructions stored thereon that, in response to execution by the at least one processor, cause the personal care device to perform actions including:
      detecting actuation of the HMI device;
      transmitting an activation request to a computing device via the network interface;
      receiving an activation token from the computing device via the network interface; and
      in response to determining that the activation token authorizes activation of the treatment application device, activating the treatment application device;
   wherein determining that the activation token authorizes activation of the treatment application device includes:
      determining a first amount of usage, wherein the first amount of usage is a total amount of usage authorized by the activation token;
      determining a second amount of usage, wherein the second amount of usage is a total amount of usage for which the treatment application device has previously been activated using the activation token; and
      determining that the activation token authorizes activation of the treatment application device based on whether the first amount of usage is greater than the second amount of usage;
   wherein the first amount of usage and the second amount of usage are amounts of time, or wherein the first amount of usage and the second amount of usage are numbers of activations.

2. The device of claim 1, further comprising a scanner, wherein the actions further include:
   scanning a unique identifier associated with a consumable product; and
   transmitting the unique identifier to the computing device via the network interface.

3. The device of claim 2, wherein scanning the unique identifier associated with the consumable product includes interrogating an RFID tag associated with the consumable product.

4. The device of claim 2, wherein scanning the unique identifier associated with the consumable product includes capturing an image of a bar code associated with the consumable product.

5. A method of activating a personal care device that includes a treatment application device, a human-machine interface (HMI) device, and a network interface, the method comprising:
   detecting, by the personal care device, actuation of the HMI device;
   transmitting, by the personal care device, an activation request to a computing device via the network interface;
   receiving, by the personal care device, an activation token from the computing device via the network interface; and
   in response to determining that the activation token authorizes activation of the treatment application device, activating, by the personal care device, the treatment application device;
   wherein determining that the activation token authorizes activation of the treatment application device includes:
      determining a first amount of usage, wherein the first amount of usage is a total amount of usage authorized by the activation token;
      determining a second amount of usage, wherein the second amount of usage is a total amount of usage for which the treatment application device has previously been activated using the activation token; and
      determining that the activation token authorizes activation of the treatment application device based on whether the first amount of usage is greater than the second amount of usage;
   wherein the first amount of usage and the second amount of usage are amounts of time, or wherein the first amount of usage and the second amount of usage are numbers of activations.

6. The method of claim 5, wherein the personal care device further includes a scanner, and wherein the method further comprises:
   scanning a unique identifier associated with a consumable product; and
   transmitting the unique identifier to the computing device via the network interface.

7. The method of claim 6, wherein scanning the unique identifier associated with the consumable product includes interrogating an RFID tag associated with the consumable product.

8. The method of claim 6, wherein scanning the unique identifier associated with the consumable product includes capturing an image of a bar code associated with the consumable product.

9. A non-transitory computer-readable medium having computer-executed instructions stored thereon that, in response to execution by one or more processors of a personal care device that includes a treatment application device, a human-machine interface (HMI) device, and a network interface, causes the personal care device to perform actions comprising:
- detecting, by the personal care device, actuation of the HMI device;
- transmitting, by the personal care device, an activation request to a computing device via the network interface;
- receiving, by the personal care device, an activation token from the computing device via the network interface; and
- in response to determining that the activation token authorizes activation of the treatment application device, activating, by the personal care device, the treatment application device;
- wherein determining that the activation token authorizes activation of the treatment application device includes:
  - determining a first amount of usage, wherein the first amount of usage is a total amount of usage authorized by the activation token;
  - determining a second amount of usage, wherein the second amount of usage is a total amount of usage for which the treatment application device has previously been activated using the activation token; and
  - determining that the activation token authorizes activation of the treatment application device based on whether the first amount of usage is greater than the second amount of usage;
- wherein the first amount of usage and the second amount of usage are amounts of time, or wherein the first amount of usage and the second amount of usage are numbers of activations.

10. The non-transitory computer-readable medium of claim 9, wherein the personal care device further includes a scanner, and wherein the actions further comprise:
- scanning a unique identifier associated with a consumable product; and
- transmitting the unique identifier to the computing device via the network interface.

11. The non-transitory computer-readable medium of claim 10, wherein scanning the unique identifier associated with the consumable product includes interrogating an RFID tag associated with the consumable product.

12. The non-transitory computer-readable medium of claim 10, wherein scanning the unique identifier associated with the consumable product includes capturing an image of a bar code associated with the consumable product.

* * * * *